United States Patent
Egbert

Patent Number: 5,088,205
Date of Patent: Feb. 18, 1992

[54] APPARATUS FOR ATTACHING LEVELS TO STUDS AND OTHER OBJECTS

[76] Inventor: Jeffrey T. Egbert, 1749 Village La., Orem, Utah 84058

[21] Appl. No.: 649,611

[22] Filed: Feb. 1, 1991

[51] Int. Cl.⁵ .............................................. G01C 9/12
[52] U.S. Cl. ..................................................... 33/371
[58] Field of Search ............... 33/370, 371, 372, 373, 33/347, 343, 451

[56] References Cited

U.S. PATENT DOCUMENTS

| | | | |
|---|---|---|---|
| 1,612,843 | 1/1927 | Timmis . | |
| 1,620,469 | 3/1927 | Kirkhoff | 33/376 |
| 1,774,267 | 3/1929 | Hanke . | |
| 2,531,563 | 9/1949 | Feldheim . | |
| 2,776,495 | 6/1953 | Dickey . | |
| 2,777,210 | 6/1953 | Johnson et al. . | |
| 3,230,623 | 1/1966 | Redding | 33/372 |
| 3,296,708 | 1/1967 | Moody | 33/371 |
| 3,988,839 | 11/1976 | Coomber | 33/371 |
| 4,501,057 | 2/1985 | Palomera | 33/371 X |

*Primary Examiner*—Harry N. Haroian
*Attorney, Agent, or Firm*—Thorpe, North & Western

[57] ABSTRACT

An apparatus for removably attaching a leveling device to an object. One application of the invention is attaching a carpenter's level to a substantially vertical stud at a construction site while the stud is being fastened into place. An elongated arm having a rectangular cross section is fastened to the leveling device so that it can swing between a storage position parallel to the measuring edge of the leveling device and a working position which is at least somewhat perpendicular to the measuring edge. A gripping member is provided to grip the object so that the object is gripped between the gripping member and the measuring edge of the leveling device. An aperture having a shape and a size slightly larger than the shape and size of the arm is provided in the gripping member and the arm is placed therethrough. When the gripping member is oriented substantially other than perpendicular to the arm, the inside dimensions of the aperture in the gripping member engage the arm and the gripping member is held in place thereon. The present invention allows a leveling device to be quickly and easily attachd to a vertical object, such as a stud, allowing a worker two free hands for fastening the stud into place. When the task is completed, the worker can readily remove the leveling device. The device can also be used on objects that are oriented in nonvertical positions and objects other than studs.

22 Claims, 6 Drawing Sheets

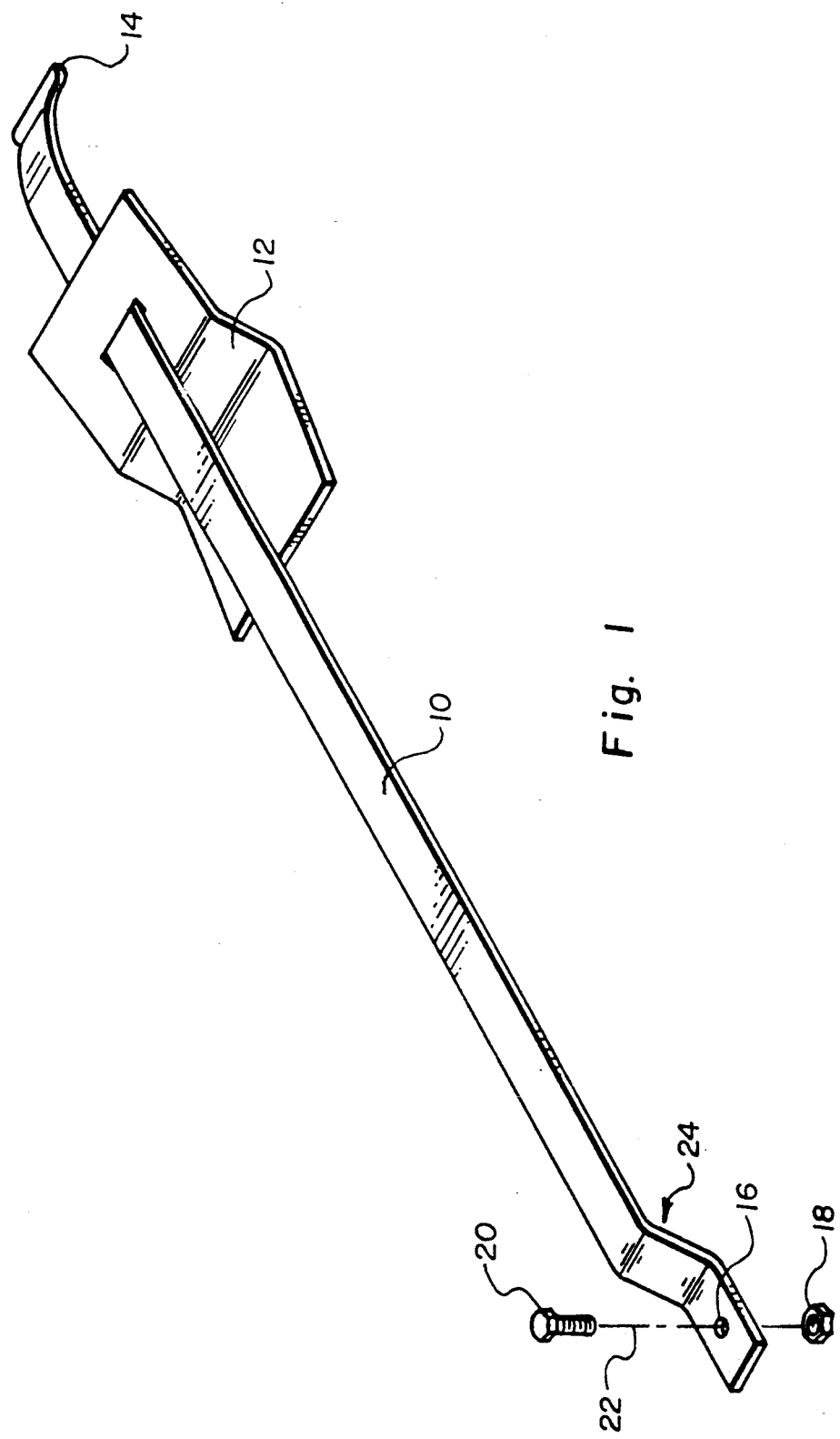

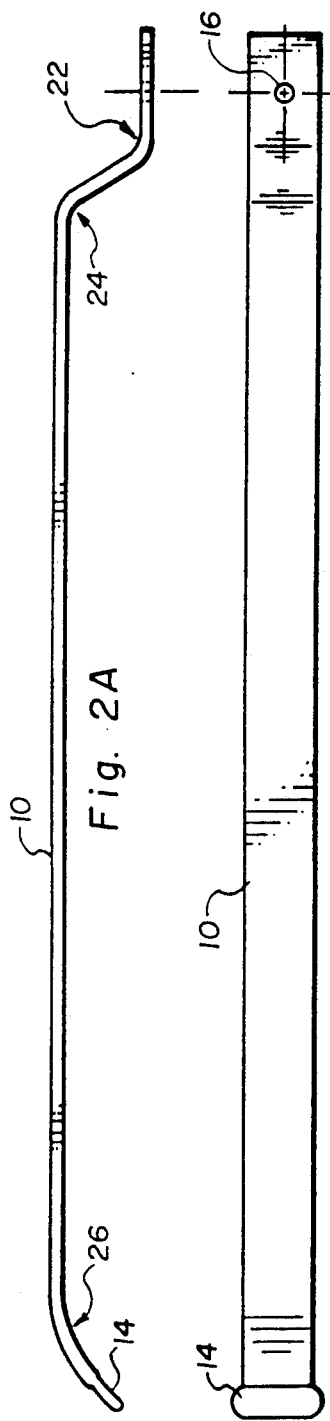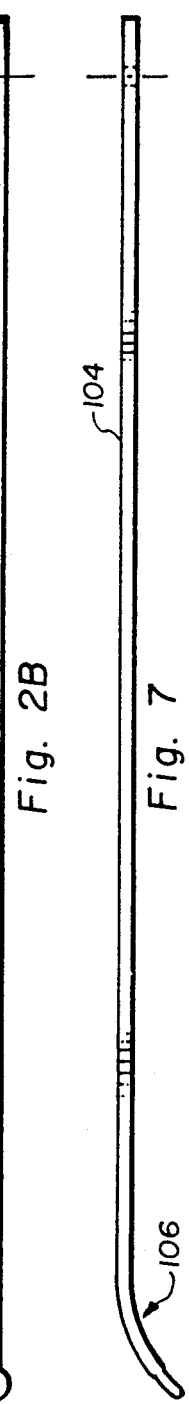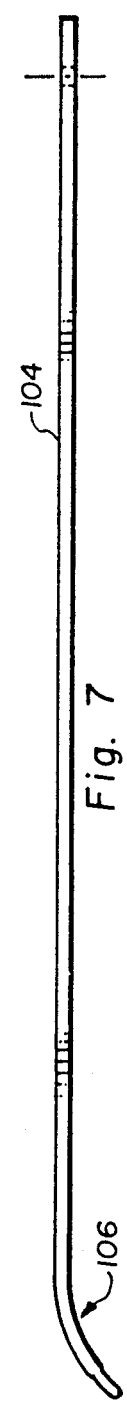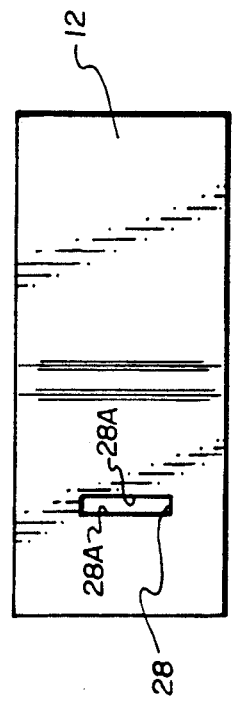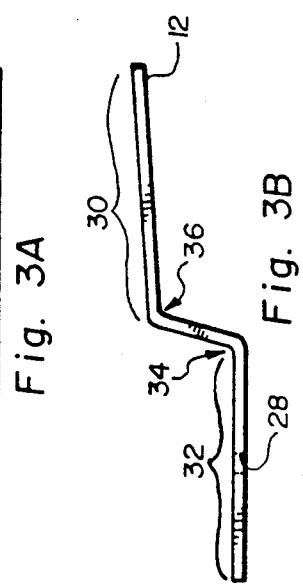
Fig. 2A
Fig. 2B
Fig. 7
Fig. 3A
Fig. 3B

APPARATUS FOR ATTACHING LEVELS TO STUDS AND OTHER OBJECTS

BACKGROUND

1. The Field of the Invention

This invention relates to apparatus used in the construction and building trades. More particularly, the present invention relates to devices used to hold a leveling device against objects.

2. The Prior Art

In the construction industry, workers regularly use leveling devices. The most common of such leveling devices is usually referred to as a "carpenter's level" but other devices, including electronic devices, are also used to determine the horizontal, vertical, or angular orientation of a various construction members.

Leveling devices are ubiquitously used to check that construction members, such as horizontal headers and sills, are level. Leveling devices are also used to determine when other construction members, such as vertical studs, are plumb. A commonly used leveling device includes a measuring edge, generally a relatively lengthy straight edge, which is placed against the surface of the object to leveled or plumbed.

Frequently, a lone construction worker needs to keep a stud or other vertical construction member plumb while fastening the stud into place. The task of fastening a stud into place is a difficult one when one hand is occupied with holding the leveling device in place and the other hand is occupied with fastening the stud into place. Because the worker must both hold the leveling device and the stud in position, the task of fastening studs into place is slower than desirable and the installed studs are sometimes out of plumb.

One device which has been proposed in the art is disclosed in U.S. Pat. No. 3,296,708 to Moody. The Moody reference discloses a level which is removably attached to metal corner bead used in drywall installations. The metal corner bead is manufactured with a plurality of holes along its length. The device disclosed in the Moody reference attaches to the holes in the corner bead and thereby holds the leveling device against the corner bead. Disadvantageously, this device is only designed for us with drywall corner bead and would require that holes be made in the objects before it could be used with objects such as studs.

Another attempt in the art to provide a device for attaching a leveling device to another object is represented in U.S. Pat. No. 2,776,495 to Dickey. The device disclosed in Dickey attaches to vertical construction members such as studs but must inconveniently be adjusted by tightening a nut each time the device is attached to a stud.

In view of the long felt need in the art to solve these problems, it would be an advance in the art to provide an apparatus for conveniently attaching and removing a leveling device to objects such as studs.

BRIEF SUMMARY AND OBJECTS OF THE INVENTION

In view of the above described state of the art, the present invention seeks to realize the following objects and advantages.

It is a primary object of the present invention to provide an apparatus which allows a leveling device to be conveniently attached to, and removed from, an object.

It is another object of the present invention to provide an apparatus which can be attached to and removed from an object without requiring tightening and loosening of fasteners.

It is a further object of the present invention to provide an apparatus for attaching a leveling device to an object which does not damage or leave marks on the surface of the object.

It is a further object of the present invention to provide an apparatus for attaching a leveling device to an object which can be used on a wide variety of types and sizes of objects.

It is a yet further object of the present invention to provide an apparatus for attaching a leveling device to an object which is conveniently stored when not in use.

It is a yet another object of the present invention to provide an apparatus for attaching a leveling device to an object which is coupled to the leveling device to prevent the loss thereof and so that it is ready for immediate use anytime.

These and other objects and advantages of the invention will become more fully apparent from the description and claims which follow, or may be learned by the practice of the invention.

The present invention comprises an apparatus for removably attaching a leveling device to an object. Most commonly, the present invention is used to attach a carpenter's level to a stud at a construction site. Other applications can also benefit from the present invention.

The preferred embodiments of the present invention include an elongated arm having a rectangular cross section. A fastener mounts the arm to the leveling device so that it can swing between a storage position adjacent and parallel to the measuring edge of the leveling device and a working position which is generally perpendicular to the measuring edge.

A gripping member is provided to grip the surface of the object s that the object is gripped tightly between the gripping member and the measuring edge of the leveling device. A means is also provided to hold the gripping member at one of a plurality of locations on the arm. In one preferred embodiment, the gripping member is fabricated with an aperture having a shape and a size slightly larger than the cross sectional shape and size of the arm. The arm is placed through the aperture and when the gripping member is oriented substantially away from a perpendicular position in relation to the arm, the gripping member engages the arm and is held at that location thereon.

The present invention allows a leveling device to be quickly and easily attached to a vertical object, such as a stud, allowing a worker two free hands for the task of fastening the stud in place. When the task is completed, the worker can readily remove the leveling device without damaging the surface of the stud and without leaving any marks. The device can also be used on objects that are aligned in nonvertical orientations and objects other than studs.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 1 is a perspective view of a first presently preferred embodiment of the present invention.

FIGS. 2A and 2B are a side view and a top view, respectively, of the arm included in the embodiment represented in FIG. 1.

FIGS. 3A and 3B are a top view and a side view, respectively, of the gripper member included in the embodiment represented in FIG. 1.

FIG. 7 is a side view of the arm included in the embodiment represented in FIG. 6.

DETAILED DESCRIPTION OF THE PREFERRED EMBODIMENTS

Reference will now be made to the drawings wherein like structures will be provided with like reference designations.

Referring first to FIG. 1, a perspective view of a first presently preferred embodiment of the present invention is provided. It will be appreciated that the present invention may be used as a retrofit to an existing leveling device or may be fabricated integrally with the leveling device. The embodiment represented in FIG. 1 can be added to an existing leveling device or manufactured therewith as will be described shortly.

The embodiment of the invention which is described herein is particularly intended to be used for removably attaching leveling devices to vertical studs functioning as construction members. Nevertheless, embodiments of the present invention can be used to attach leveling devices to many objects other than studs, including objects which are in a nonvertical orientation.

The first described embodiment shown in FIG. 1 includes an arm 10. The arm 10 is preferably substantially longer than the width of the widest stud which the embodiment is to be used with. For example, if the embodiment of the invention is to be used with studs having a nominal dimension of 2 inches by 4 inches, then the arm should be substantially longer than the 4 inch dimension. In practice, the embodiments of the present invention will be used with a range of construction member sizes, for example, up to 10 inches wide. Because of the versatility of the present invention, the embodiments of the invention can generally be equipped with a single length of arm 10 and used with a variety of objects.

A mounting aperture 16 is provided at one end of the arm 10. The mounting aperture 16, in cooperation with bolt 20 and nut 18, function as a preferred example of a means for swingably mounting the arm 10 to the leveling device as is illustrated in later figures. One end of the arm 10 is offset from the remainder. This arrangement allows the illustrated embodiment to work particularly well with a leveling device including an I beam structure having a channel between two measuring edges.

Figure 4A:
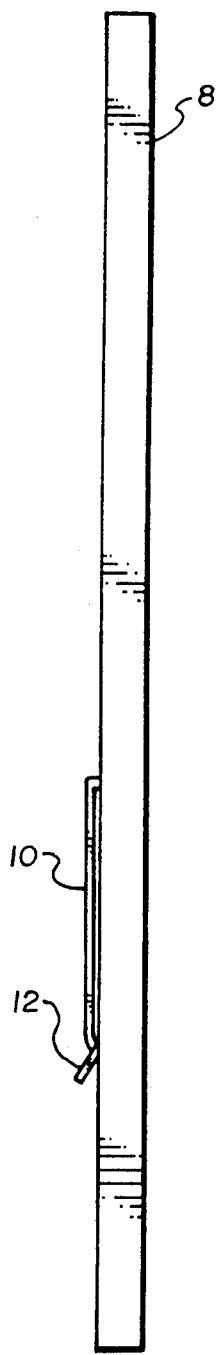
FIGS. 4A, 4B, and 4C are a side view, a front view, and an end view, respectively, of the embodiment represented in FIG. 1 installed on an I-beam level as is commonly used in the construction industry.
Figure 4B:
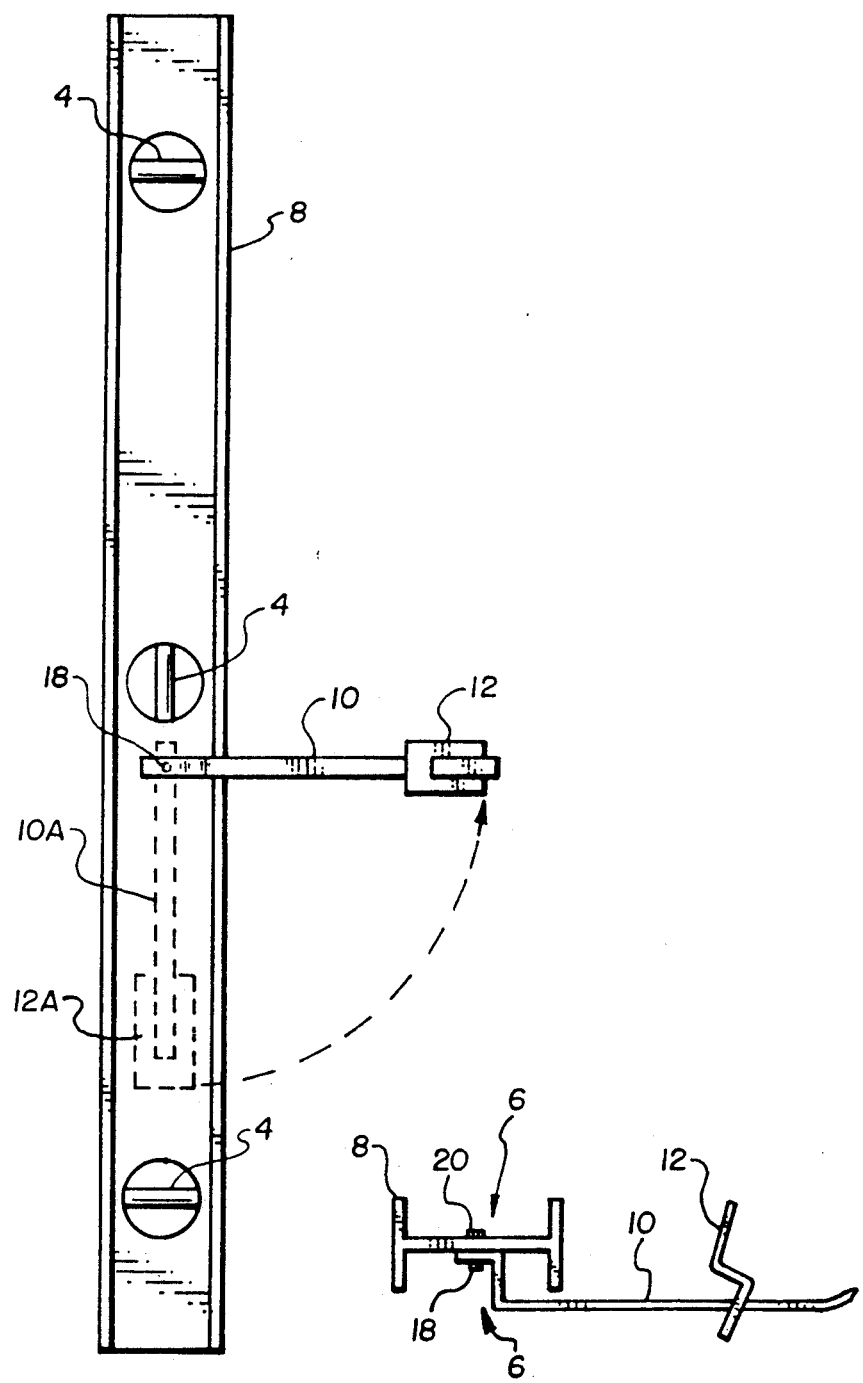
Figure 4C:
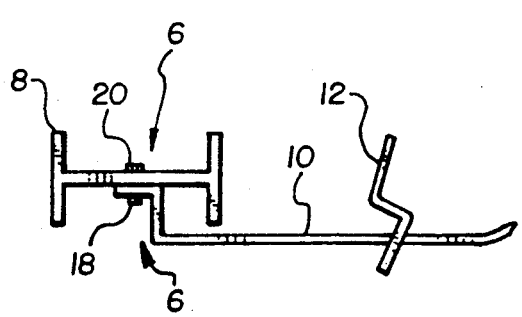

As can be observed in the figures, the leveling devices illustrated herein comprise a plurality of "spirit levels," also known as "bubble levels," which are mounted in an I beam structure as represented in FIGS. 4A-C. The leveling devices illustrated herein are generally know as "levels" or "carpenter's levels," however, the present invention can be used with other leveling devices. It will be appreciated that the term "leveling device" includes devices which are able to detect horizontal, vertical (such as those devices illustrated herein), as well as other angular orientations.

Also represented in FIG. 1 is a gripping member 12. The gripping member 12 is slidably attached to the arm 10. The gripping member 12 is held onto the arm 10 by a stop 14 formed on the arm 10. The gripping member 12 can be slide along the arm 10 and held in any one of a plurality of positions to fit the width of the stud or other object.

The gripping member 12 is the presently preferred example of a means for gripping the surface of the object included in the present invention. Other structures performing similar or the same functions, however, can be used within the scope of the present invention.

Figure 5A:
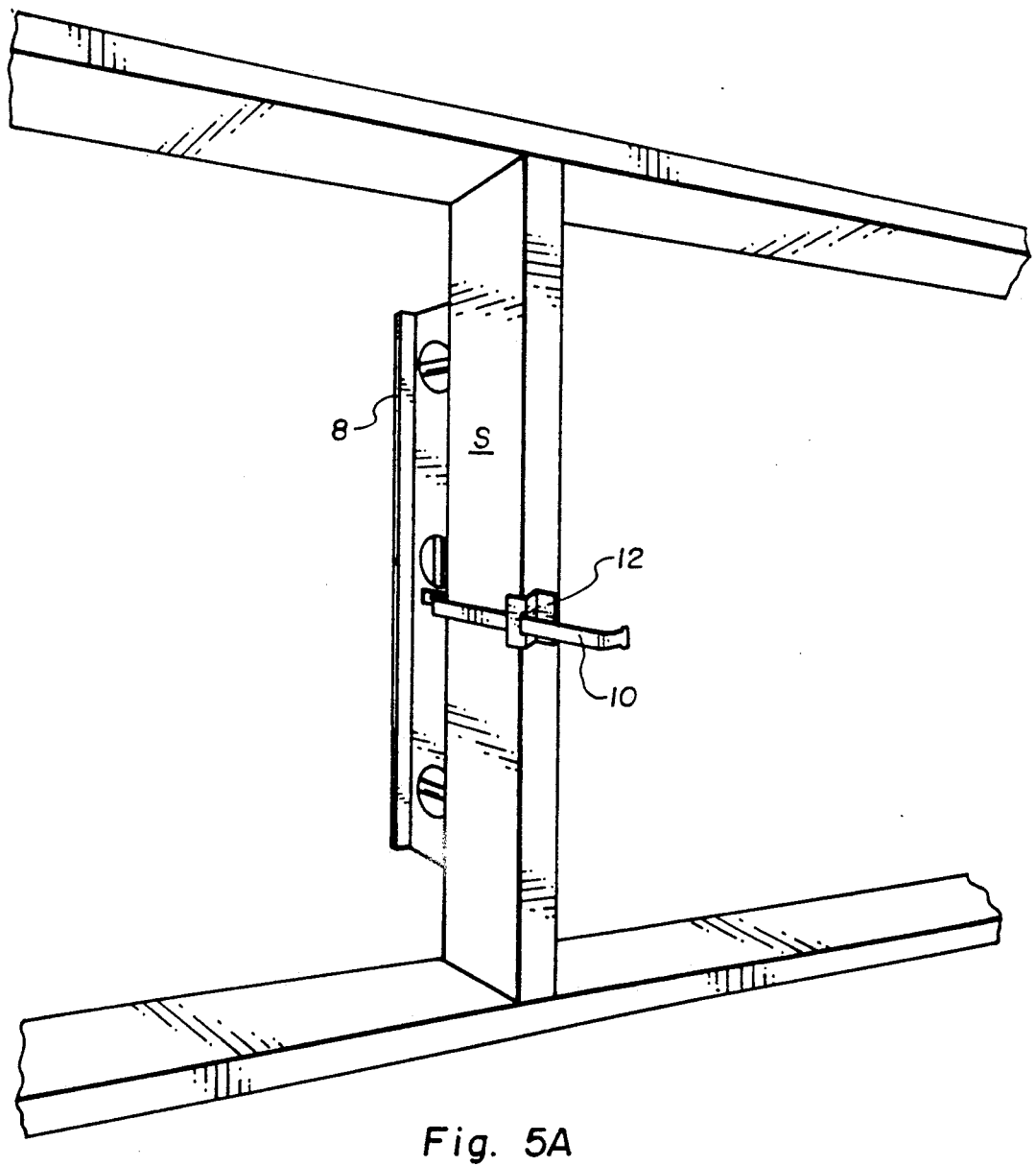
FIGS. 5A and 5B are a perspective view and a cross sectional view, respectively, of the embodiment represented in FIG. 1 attached to a vertical stud.
Figure 5B:
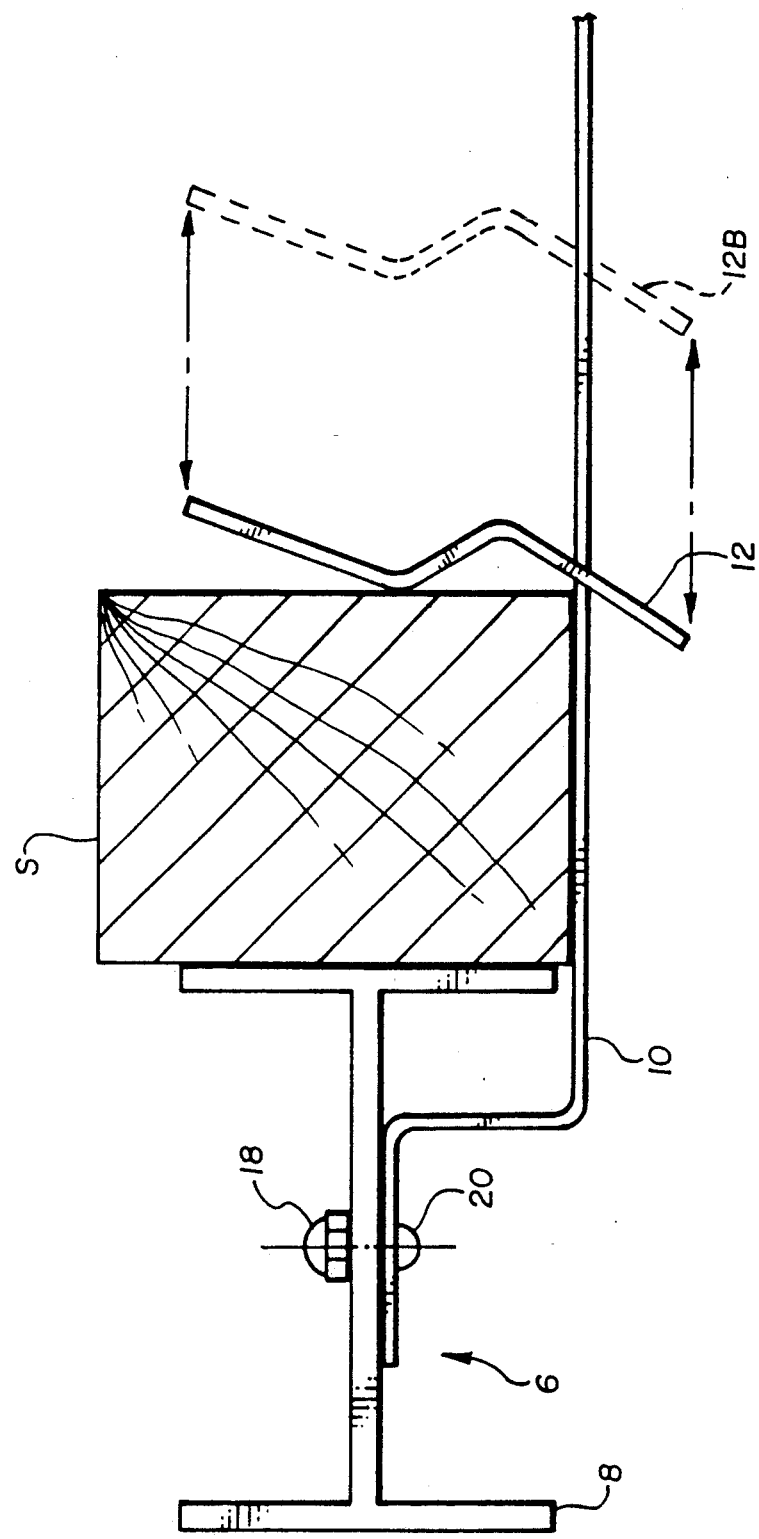

FIG. 2A provides a side view of the arm 10 represented in FIG. 1. A first bend 22 and a second bend 24 are provided to give the arm 10 the necessary offset for best operation with an I beam leveling device as represented in FIGS. 5A and 5B. A third bend 26 in the arm 10 is provided to allow the gripping member 12 to be laid against the arm 10 when in the storage position as represented in FIGS. 4A and 4B. It will be appreciated that other structures can also be devised to allow the gripper member 12 to lay against the arm 10 when in the storage position. Also represented in FIG. 2B is the stop 14 provided at the end of the arm 10 and the mounting aperture 16.

The arm 10 represented in FIGS. 2A and 2B, and the arm represented in FIG. 7, function as the presently preferred examples of a means for connecting the gripping member to the leveling device. It will be appreciated that other structures performing the same or similar functions are also to be considered within the scope of the means for connecting included in the present invention.

FIG. 3A provides a top view of the gripper member 12 included in the preferred embodiment represented in FIG. 1. A slot 28 is represented through which the arm 10 is inserted. The shape and size of the slot 28 is important to the operation of the represented embodiment. The slot 28 should be just slightly larger than the cross sectional dimensions of the arm. The edges of the slot 28 should be sharp rather than rounded. Also, in some cases the materials from which the gripper member 12 and the arm 10 are fabricated should be carefully chosen for optimum operation.

With the slot 28 having dimensions slightly larger than, or very close to, those of the arm 10, when the sides 28A of the slot 28 are oriented in a substantially nonparallel orientation to the sides of the arm 10, the edges of the slot 28 frictionally engage the surface of the arm 10 and hold the gripper member 12 in place. It will be appreciated that the gripper member 28 is held in place as long as the pressure is applied to it. The flexibility and shape of the gripper member 12 functions to keep the gripper member 12 engaged and in the proper place.

The slot 28, in cooperation with the arm 10, is the presently preferred example of the means for holding the gripper member which is included in the present invention. It will be appreciated that other arrangements can be used to hold the gripper member in place and function as the means for holding. Advantageously, with the illustrated structure, a user can quickly attach and remove the embodiment from a vertical stud thus freeing both hands for other tasks.

A first portion of the gripper member, indicated at bracket 32, should be of a shape and a size which can be conveniently grasped by a user to move the same. A contact surface, indicated at bracket 30, is provided to contact the surface of the stud or other object.

The preferred angular orientation of the contact surface is illustrated in the side view of FIG. 3B. The degree of the first and the second bends, 34 and 36, are such that the slot 28 is kept engaged against the surface of the arm 10 when the contact surface 30 is against the surface of the stud. Preferably, the outside of bend 36 contacts the surface of the object. Thus, the first portion 32 of the gripper member 12 is preferably not parallel to the contact surface 30 of the gripper member 12.

Referring next to FIGS. 4A, 4B, and 4C, which are a side view, a front view, and an end view, respectively, of an I beam level 8 which includes components similar to those represented in FIG. 1. The end view of FIG. 4C best shows the "I" cross sectional shape of the level device 8 with two channels, generally indicated at 6, into one of which the arm 10 and gripper member 12 are stored. FIG. 4B shows three spirit level glass components 4 which are preferably those which are known and readily available in the art.

FIG. 4A shows the arm 10 and the gripping member 12 in a storage configuration. FIG. 4A illustrates how the first and the second bends formed in the arm 10 allow the arm to clear the sides of the I beam. FIG. 4B shows the arm 10A and the gripper member 12A in phantom image in the storage configuration. One of the advantages of the present invention is that the arm 10 and the gripper member 12 are swung out of the way when in the storage position.

When it is desired to attach the level to a stud or other object, a user swings the arm 10 to the working position represented by the solid image in FIG. 4B. The arm 10 is mounted to the level 8 so that it can rotatably swing between the positions shown. It will be appreciated that the construction of the arm 10 should allow it to flex when moving between the storage configuration and the working configuration, yet be strong enough to withstand rugged use. Those skilled in the art will be able to implement other structures within the scope of the present invention which perform the functions of the arm 10.

In FIGS. 5A and 5B, an embodiment of the present invention is shown attached to a vertical stud S. The cross sectional view of FIG. 5B illustrates the relationship between the stud S, the level 8, and the arm 10 with the gripper member 12 being moved in the direction indicated by the arrows to attach the level 8 to the stud S.

Desirably, the gripping member 12 is constructed so that it contacts the surface of the stud or other object without marring or marking its surface. The gripping member 12 should also be flexible so that even when it is positioned tightly against the stud S, a user can flex it further to release it and move it further along the arm 10 for easy removal and repositioning. It will be understood that it is not always necessary that the gripper member 12 be positioned on the arm 10 so that it tightly grips the stud S; loosely positioning the gripping member against the stud S will attach the level to the stud S.

Figure 6:
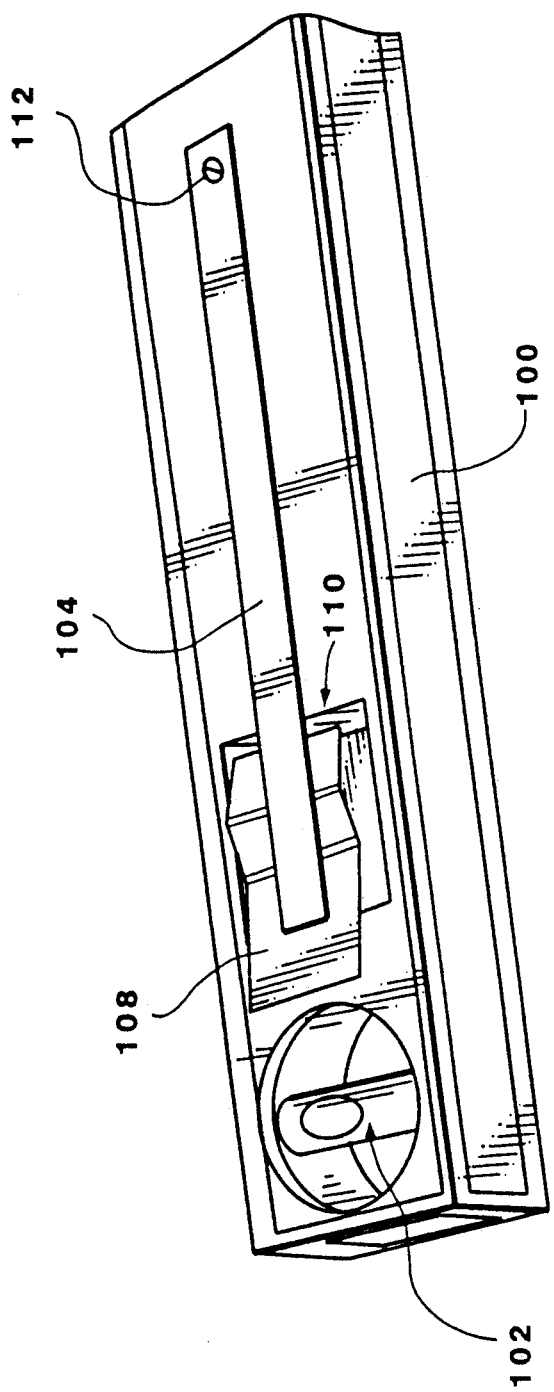
FIG. 6 is a perspective view of another presently preferred embodiment of the present invention installed on a box beam level.

Another embodiment of the present invention is represented in FIG. 6. The embodiment illustrated in FIG. 6 includes a box beam level device 100 which is generally fabricated from a wood material, such as mahogany, or some other material. A spirit level or bubble glass 102 is provided on the device such as is represented at 102.

An arm 104 is mounted on the box beam level device 100 using a bolt 112 which allows the arm 104 to swing. In FIG. 6, the embodiment is represented with the arm in its storage position. A recess, generally designated at 110, is provided to receive a gripping member 108 which is preferably similar or identical to the earlier described gripping member structure. The recess 110 functions to keep the gripping member 108 out of the way when the arm 104 is in the storage configuration.

A side view of the arm 104 represented in FIG. 6 is provided in FIG. 7. As illustrated in FIG. 7, the arm 104 is straight except for the bend 106 provided at the end of the arm 104 and which functions similarly to bend 26 represented in FIG. 2A. The flat sides of the box beam level device 100 allow the arm to be straight rather than including the additional bends provided in the arm 10 represented in FIG. 2A. Using the teachings contained herein, it will be appreciated that the present invention ca be adapted to additional useful applications.

In view of the forgoing, it will be appreciated that the present invention provides an apparatus which allows a leveling device to be conveniently attached to and removed from an object without requiring tightening and loosening of nuts or other fasteners. The present invention also provides an apparatus for attaching a leveling device to an object which does not damage the surface of the object and which can be used on a wide variety of types and sizes of objects. Still further, the present invention provides an apparatus for attaching a leveling device to an object which is conveniently stored when not in use and which is coupled to the leveling device to prevent the loss thereof and so that it is ready for immediate use anytime.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United State Letters Patent is:

1. An apparatus for attaching a leveling device to an object, the apparatus comprising:
   means for gripping the surface of the object;
   means for connecting the means for gripping to the leveling device;
   means for swingably mounting the means for connecting on the leveling device and for allowing the means for connecting to swing between a first position which is substantially parallel to a side of the leveling device and a second position which is substantially perpendicular to the measurement side; and means for holding the means for gripping at any one of a plurality of locations on the means for connecting such that the means for gripping can be positioned in any one of a plurality of spaced relationships from the leveling device such that the leveling device can be attached to any one of a plurality of objects having differing dimensions and readily removed therefrom.

2. An apparatus for attaching a leveling device to an object as defined in claim 1 wherein the means for gripping the surface of the object comprises a flat member having a first portion offset from a second portion.

3. An apparatus for attaching a leveling device to an object as defined in claim 1 wherein the means for connecting comprises an elongated arm.

4. An apparatus for attaching a leveling device to an object as defined in claim 1 wherein the means for holding the means for gripping comprises an aperture formed in the mean for gripping through which the means for connecting is positioned.

5. An apparatus for attaching a leveling device to an object as defined in claim 1 further comprising an I beam leveling device, the means for holding being pivotally connected to the I beam leveling device.

6. An apparatus for attaching a leveling device to an object as defined in claim 5 wherein the I beam leveling device comprises a plurality of bubble level structures.

7. An apparatus for attaching a leveling device to an object as defined in claim 1 further comprising a box beam leveling device, the means for holding being pivotally connected to the box beam leveling device.

8. An apparatus for attaching a leveling device to an object as defined in claim 7 wherein the box beam leveling device comprises a recess, the recess adapted for receiving the means for gripping when the means for gripping is in a storage position.

9. An apparatus for attaching a leveling device to an object as defined in claim 1 wherein the means for connecting comprises an elongated arm pivotally connected to the leveling device and wherein the means for holding comprises an aperture formed in the means for gripping, the aperture having a cross sectional size just slightly larger than the cross sectional size of the arm such that when the means for gripping is oriented at a first angle with respect to the arm the means for gripping can move along the arm and when the means for gripping is oriented at a second angle with respect to the arm the means for gripping is held in its position on the arm.

10. An apparatus for checking the vertical orientation of an object comprising:
a straight measuring edge adapted for placement against the object;
a level detection device connected to the straight measuring edge;
an arm;
means for connecting the arm to the straight measuring edge, the arm having a storage position substantially parallel to the straight measuring edge and a working position substantially perpendicular to the straight measuring edge;
a gripping member, the gripping member having an aperture formed therein having a shape and a size slightly larger than the shape and size of the arm such that when the gripping member is oriented at a first angle in relation to the arm the gripping member engages the arm and is held in one of a plurality of selected locations thereon.

11. An apparatus for checking the vertical orientation of an object as defined in claim 10 wherein the level detection device comprises a bubble level structure.

12. An apparatus for checking the vertical orientation of an object as defined in claim 10 wherein the arm comprises an elongated arm having a rectangular cross sectional shape.

13. An apparatus for checking the vertical orientation of an object as defined in claim 10 wherein the means for connecting the arm comprises an aperture formed in the arm and a fastener placed therethrough.

14. An apparatus for checking the vertical orientation of an object as defined in claim 10 wherein the measuring edge comprises an edge of an I beam structure.

15. An apparatus for checking the vertical orientation of an object as defined in claim 10 wherein the object is a vertical stud.

16. An apparatus for checking the vertical orientation of an object as defined in claim 10 further comprising a recess which is adapted for receiving the gripping member when the arm is in its storage position.

17. An apparatus for removably attaching a level to a substantially vertical object, the level including at least one level detection device and a measuring edge adapted for placement against the object, the apparatus comprising:
an elongated arm having a substantially rectangular cross sectional shape;
means for connecting the elongated arm to the level so that the arm has a storage position and a working position, the working position including a position which is substantially perpendicular to the measuring edge;
a gripping member;
an aperture formed in the gripping member, the aperture having a shape and a size slightly larger than the cross sectional shape and size of the arm such that when the gripping member is oriented at a first angle in relation to the arm the gripping member engages the arm and is held in one of a plurality of selected locations thereon.

18. An apparatus for removably attaching a level to a substantially vertical object as defined in claim 17 wherein the gripping member comprises a flat member having a first portion offset from a second portion.

19. An apparatus for removably attaching a level to a substantially vertical object as defined in claim 17 wherein the level comprises a I beam level.

20. An apparatus for removably attaching a level to a substantially vertical object as defined in claim 17 wherein the level comprises a box beam level.

21. An apparatus for removably attaching a level to a substantially vertical object as defined in claim 20 further comprises a recess in the box beam level, the recess adapted for receiving the gripping member when the gripping member is in its storage position.

22. An apparatus for attaching a leveling device to an object, the apparatus comprising:
means for gripping the surface of the object;
means for connecting the means for gripping to the leveling device;
means for swingably mounting the means for connecting on the leveling device, the means for swingably mounting comprising a first aperture formed in the leveling device, a second aperture formed on the means for connecting, and a fastener placed through the first and the second apertures; and means for holding the means for gripping at any one of a plurality of locations on the means for connecting such that the means for gripping can be positioned in any one of a plurality of spaced relationships from the leveling device such that the leveling device can be attached to any one of a plurality of objects having differing dimensions and readily removed therefrom.

* * * * *